UNITED STATES PATENT OFFICE.

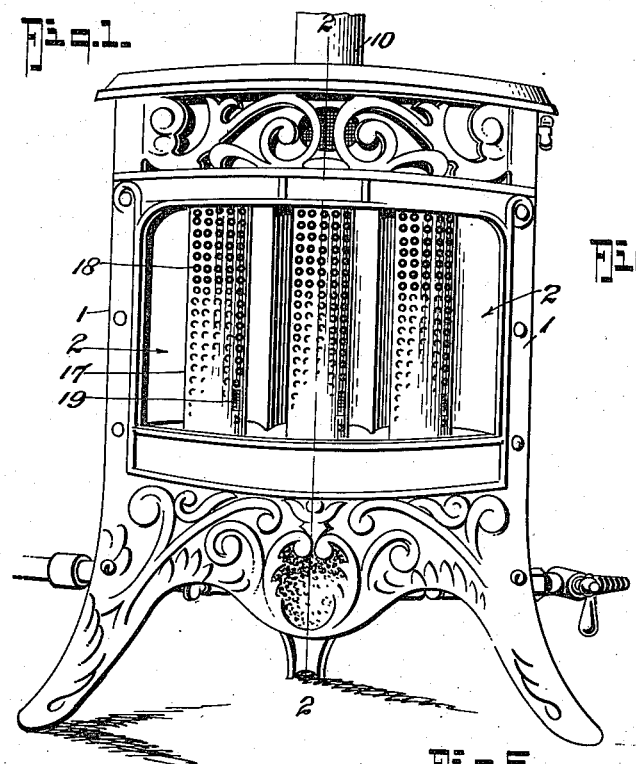
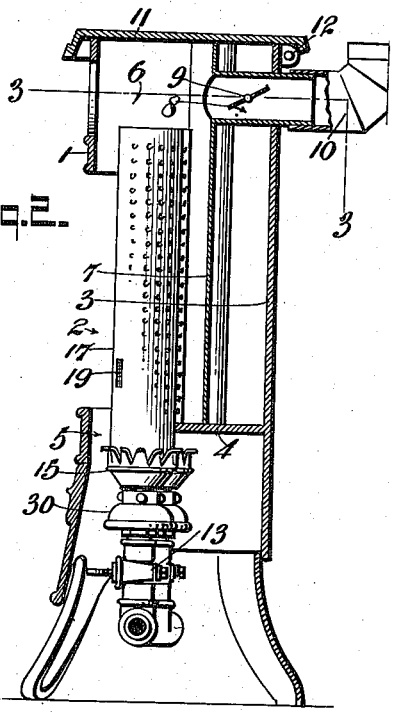
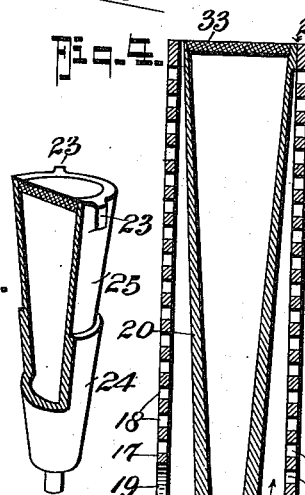
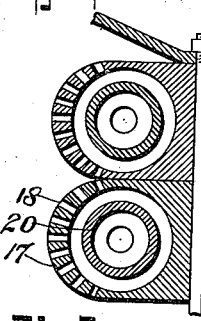
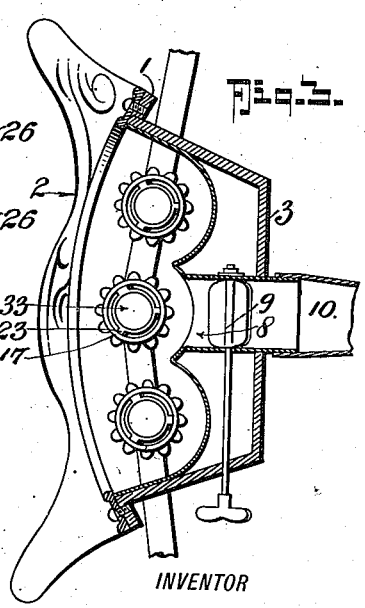

GUSTAVE F. SCHMIDT, OF CHICAGO, ILLINOIS.

HEATER.

1,216,848.   Specification of Letters Patent.   Patented Feb. 20, 1917.

Application filed April 22, 1914. Serial No. 833,673.

*To all whom it may concern:*

Be it known that I, GUSTAVE F. SCHMIDT, residing at Chicago, in the county of Cook and State of Illinois, have invented certain new and useful Improvements in Heaters, of which the following is a specification.

My invention provides a heater which is especially adapted for use with gaseous fuel, and the primary object of the invention is to provide a heater in which the generated heat units are given off, principally by radiation, directly into the room, the heating elements being so designed as to give off the maximum quantity of heat units by radiation and only a relatively small amount by convection, the parts being so designed as to reduce the flue waste of heat to the minimum.

Again the invention provides a special construction of heating element in which the incandescent member is protected by a perforated envelop the two being so designed that the incandescent member will become uniformly luminous throughout its length and thereby add to the efficiency of the apparatus.

In its more detailed nature the invention includes those novel features of construction, operation and arrangement of parts all of which will be first fully described and then be specifically pointed out in the appended claims, reference being had to the accompanying drawing, in which:—

Figure 1 is a perspective view illustrating one form of the invention.

Fig. 2 is a cross section on the line 2—2 of Fig. 1, the heating elements being indicated in elevation.

Fig. 3 is a horizontal section on the line 3—3 of Fig. 2.

Fig. 4 is an enlarged vertical longitudinal section showing one form of the heating elements.

Fig. 5 is a detail perspective view of a modification of the inner refractory body.

Fig. 6 is a cross section showing a modification of the outer refractory body.

Fig. 7 is a view similar to Fig. 6, of a further modification in which the inner cone is omitted and its function is performed by fins or projections which extend into the path of the burner flame.

Fig. 8 is a further modification similar to Fig. 7.

In the drawing in which like numerals of reference designate like parts in all of the figures, 1 is the front of the heater which is open at 2 to provide for the direct radiation of heat into the room, and 3 designates the body of the heater which may be of cast or sheet iron, or other suitable material, as desired.

The heater casing includes a partition 4, with openings 5 through which the heating elements project. 6 is a chamber at the top of the heater which is in communication with the flue 10 through a duct 8 that contains the damper 9. The top 11 of the heater is hinged at 12 so it may be thrown back to expose the interior, if found desirable.

The burners 14 are located above the cocks 13 and the burners 14 are of a special construction and are provided with sockets 16 to receive the pins 22 in the lower ends of the inner refractory bodies or cones 20, to sustain the same.

15 is a base which is supported on the burners and receives the outer refractory body 17.

In the preferred construction in Figs. 1 to 4 inclusive, the outer refractory body 17 is provided throughout with perforations 18 and is of a cylindrical form, while the inner refractory body 20 is of frusto-conical form with its end of lesser diameter at the bottom and its end of greater diameter almost filling (enough space being of course left to permit escape of the products of combustion) the upper end of the outer refractory body 17, there being spacing lugs 23 provided on the body 20, if desired.

In the preferred form, the inner cone or refractory body 20 is made of thicker material at the bottom and gradually tapers to a thin shell at the top whereby to expose substantially a uniform mass to the heating flame at any place along the length of the body 20. That is to say, a cross section of the body 20 at any place will be substantially a constant area.

The inner body 20 is preferably made with a cover 33 so that the inner chamber may be closed, as I have found that by making the inner chamber closed, the radiating ability of the inner refractory body 20 is increased considerably and the collection of dust inside of the hollow element is avoided.

The outer refractory body 17 is provided with a slot 19 through which ignition may be made.

In the modified form shown in Fig. 5, the reduction in thickness of the cone toward the top is made by stepping the cone as at 24 and 25, each step having its walls of uniform thickness instead of tapering as in the form shown in Fig. 4.

In Fig. 6, I have shown a further modification of the outer refractory body and in that form such body is made with flue projections 26 having bolt holes through which the fastening bolts may pass to secure the same to the heater housing.

The forms shown in Figs. 7 and 8 differ from the forms shown in Fig. 6 in the omission of the inner refractory cone 20, and the provision, in lieu of the same, of projections 27 which are adapted to be rendered incandescent by the heating flame.

In the form shown in Figs. 1 to 4 inclusive, the heating elements are backed by a reflector 7.

The burner, which is of a special construction designed to afford the greatest possible heating efficiency with the minimum consumption of gas, consists of the head 28 which has a circular row of perforations 29 through which the combustible substance is transmitted, the "bell" 30 of the burner having air openings 31 that are controlled by a suitable slide 32 whereby the amount of air may be regulated.

Each heating element of the heater is provided with a suitable cock 13 so that the heating element may be independently operated, if desired.

In operation the gas is ignited at the burner and the heating flame is located between the elements 17 and 20, the flame completely surrounding or enveloping element 20 and raising it to incandescence.

The cold air currents of the room are prevented from engaging the inner cone 20 by reason of the perforated outer shell or body 17 and thus the temperature of the inner refractory body or cone will be kept to its maximum degree of efficiency.

From the foregoing description taken in connection with the accompanying drawing, it is thought the complete construction, operation and advantages of my invention will be clear to those skilled in the art.

What I claim is:—

1. In a heater, a heating element comprising an outer perforated shell of refractory material, a Bunsen burner projecting into said shell and an inner refractory body located within said shell and of frusto-conical form with its end of lesser diameter adjacent to the burner, said outer perforated shell being subjected to the direct action of the flame.

2. In a heater of the class described, a heating element comprising a burner, an outer shell of refractory material carried by said burner to inclose the burner flame and a hollow inner refractory body of frusto-conical form and located with its end of lesser diameter adjacent to the burner, said inner body having its walls of diminishing thickness from the end of lesser diameter toward the end of greater diameter substantially as shown and described.

3. In a heater, a heating element comprising a burner, a refractory outer shell into which one end of said burner projects, a refractory inner shell of substantially conical form with its end of lesser diameter located adjacent to the burner and its end of greater diameter conforming closely to the internal diameter of said outer shell but spaced slightly therefrom, spacing lugs for holding said inner shell spaced from said outer shell, said outer shell having perforations and enveloping the burner flame.

4. In a heater, a heating element comprising a burner, a base carried by the burner, an outer perforated cylindrical body carried by said base and into which the lower end of said burner projects, an inner imperforated refractory body of substantially conical form located within said outer body with its end of lesser diameter adjacent to said burner, means for connecting said end to said burner for supporting purposes, the end of greater diameter of said inner body forming a substantial closure for the upper end of said cylindrical body, but spaced slightly from the walls thereof whereby to confine the burner flame to the space between said bodies and cause said inner body to become incandescent.

5. In a heater of the class described, a burner including a mixing chamber in which the air and gas is admitted, said burner having a head provided with a circular series of perforations through which the gaseous mixture passes, a central lug projecting from said head and aperture, an outer shell of refractory material carried by the said burner and into which said burner head projects, and an inner refractory body located within said outer shell and having a lug held in said recess of said burner head lug to be supported thereby.

6. In a heater of the class described, a heating element comprising a burner having a tubular body portion, means for passing gas into said tubular body portion, controlled means for passing air into said body portion, said burner including a head having a central boss provided with a recess, said head being also provided with a circular series of flame apertures surrounding said boss, an outer body set over said burner to embrace said head and an inner body of frusto-conical form having its end of lesser diameter adjacent to said burner head and provided with a lug to enter said boss recess to be supported thereby, all being arranged whereby the burner flame will encircle the base of said coni-form body and raise the same to incandescence.

7. In a heater of the class described, a plurality of heating elements, each comprising an outer perforated cylindrical shell of refractory material, a burner projected into said shell and including a body having perforations in its top and a central socket portion, an inner refractory body located within said shell and having a projection to enter said socket portion, said inner refractory body being of frusto-conical form with its end of lesser diameter adjacent to the burner, substantially as shown and described.

8. In a heater, a heating element, comprising an outer perforated cylindrical shell of refractory material, a burner projected into said shell and including a body having perforations in its top and a central socket portion, an inner refractory body located within said shell and having a projection to enter said socket portion, said inner refractory body being of frusto-conical form with its end of lesser diameter adjacent to the burner substantially as shown and described.

9. In a heater of the class described, a plurality of heating elements, each comprising an outer perforated cylindrical shell of refractory material, a burner projected into said shell and including a body having perforations in its top and a central socket portion, an inner refractory body located within said shell and having a projection to enter said socket portion, said inner refractory body being of frusto-conical form with its end of lesser diameter adjacent to the burner, a single fuel pipe to said burners and separate cocks for controlling the feed of fuel to the individual burners whereby any one or more of said burners may be used, and a heater housing incasing said heating elements.

10. In a heater, a heating element which comprises an outer shell of relatively greater length than diameter and an inner shell of relatively greater length than diameter, said inner shell being substantially coniform with its base end upwardly, said shells being in close juxtaposition whereby they are subjected to the direct action of the flame, and a burner to direct a flame around said inner shell to act on both shells.

11. In a heater, a heating element which comprises an outer shell and an inner shell, a burner designed to project the flame within the outer shell to surround the inner shell, said shells being in close juxtaposition whereby they are subjected to the direct action of the flame.

12. In a heater, a heating element which comprises an outer shell-like body and an inner body, a burner designed to project the flame within the outer shell-like body to surround the inner body, said bodies being in juxtaposition whereby they are subjected to the direct action of the flame, said burner including body supporting elements in engagement with the said bodies.

13. In a heater, a heating element which comprises an outer shell-like body and an inner body, a burner designed to project the flame within the outer shell-like body to surround the inner body, said bodies being in juxtaposition whereby they are subjected to the direct action of the flame, said burner including body supporting elements in engagement with the said bodies and including a mixing chamber projected into the outer shell-like body.

GUSTAVE F. SCHMIDT.

Witnesses:
J. M. JESSEN, Jr.,
ALEX. E. SPORNEY.